US011505430B2

(12) United States Patent
Juntunen et al.

(10) Patent No.: US 11,505,430 B2
(45) Date of Patent: Nov. 22, 2022

(54) METHOD AND ARRANGEMENT FOR CONDITION MONITORING OF A ROPE OF A HOISTING APPARATUS

(71) Applicant: Kone Corporation, Helsinki (FI)

(72) Inventors: Mika Juntunen, Helsinki (FI); Mikko Puranen, Helsinki (FI); Kim Antin, Helsinki (FI); Telmo Santos, Helsinki (FI); Miguel Machado, Helsinki (FI)

(73) Assignee: Kone Corporation, Helsinki (FI)

( * ) Notice: Subject to any disclaimer, the term of this patent is extended or adjusted under 35 U.S.C. 154(b) by 1058 days.

(21) Appl. No.: 16/176,657

(22) Filed: Oct. 31, 2018

(65) Prior Publication Data
US 2019/0202666 A1  Jul. 4, 2019

(30) Foreign Application Priority Data
Dec. 29, 2017  (EP) .................................. 17211045

(51) Int. Cl.
*B66B 7/12* (2006.01)
*B66B 1/34* (2006.01)
(Continued)

(52) U.S. Cl.
CPC .......... *B66B 7/1223* (2013.01); *B66B 1/3484* (2013.01); *B66B 7/062* (2013.01);
(Continued)

(58) Field of Classification Search
CPC ....... B66B 7/1223; B66B 7/062; B66B 7/123; B66B 1/3484; B66B 1/468; B66B 1/2458;
(Continued)

(56) References Cited

U.S. PATENT DOCUMENTS

2004/0046540 A1* 3/2004 Robar ....................... G01L 5/10
324/71.2
2008/0223666 A1* 9/2008 Cuthbert ............. B66B 11/0407
187/293
(Continued)

FOREIGN PATENT DOCUMENTS

EP           2020394 A1    2/2009
EP           2894119 A1    7/2015
WO    WO-2010098756 A1    9/2010

OTHER PUBLICATIONS

European Search Report for EP 17211045.4 dated Jun. 25, 2018.
Chinese Office Action dated May 10, 2022 by the Patent Office of China for Application No. 201811487421.6.

*Primary Examiner* — Raul J Rios Russo
(74) *Attorney, Agent, or Firm* — Harness, Dickey & Pierce, P.L.C.

(57) ABSTRACT

The invention relates to a method for condition monitoring of a rope of a hoisting apparatus, and to an arrangement for condition monitoring of a rope of a hoisting apparatus, preferably of an elevator for transporting passengers and/or goods. The arrangement for condition monitoring of a rope of a hoisting apparatus according to the present invention, in which rope comprises one or more conductive load bearing member for bearing the load exerted on the rope in longitudinal direction and extending parallel to each other and to the longitudinal direction of the rope, comprises an at least one eddy current testing probe, placed near said rope for generating an alternating magnetic field, said alternating magnetic field causing eddy currents in said rope, and for detecting a secondary magnetic field being generated by said eddy currents in said rope as eddy current detection data, and an on-line monitoring unit receiving and utilizing said eddy current detection data for on-line condition monitoring of said rope.

30 Claims, 11 Drawing Sheets

(51) Int. Cl.
*B66B 7/06* (2006.01)
*G01L 5/10* (2020.01)
*G01N 27/9013* (2021.01)
*B66B 1/46* (2006.01)
*B66B 1/24* (2006.01)
*G01N 27/904* (2021.01)

(52) U.S. Cl.
CPC ............. *B66B 7/123* (2013.01); *G01L 5/10* (2013.01); *G01N 27/902* (2013.01); *G01N 27/9026* (2013.01); *B66B 1/2458* (2013.01); *B66B 1/468* (2013.01); *E05Y 2400/54* (2013.01); *E05Y 2400/664* (2013.01); *E05Y 2900/104* (2013.01); *G01N 27/904* (2013.01)

(58) Field of Classification Search
CPC .... G01L 5/10; G01N 27/902; G01N 27/9026; G01N 27/904; E05Y 2900/104; E05Y 2400/54; E05Y 2400/664
See application file for complete search history.

(56) References Cited

U.S. PATENT DOCUMENTS

| | | | |
|---|---|---|---|
| 2014/0266169 A1* | 9/2014 | Huntley | D07B 1/145 385/100 |
| 2019/0256324 A1* | 8/2019 | Antin | B66B 7/1223 |
| 2019/0330017 A1* | 10/2019 | Kattainen | B66B 5/0025 |
| 2020/0087112 A1* | 3/2020 | Legua | B66B 5/048 |

* cited by examiner

METHOD AND ARRANGEMENT FOR CONDITION MONITORING OF A ROPE OF A HOISTING APPARATUS

This application claims priority to European Patent Application No. EP17211045.4 filed on Dec. 29, 2017, the entire contents of which are incorporated herein by reference.

FIELD OF THE INVENTION

The invention relates to a method for condition monitoring of a rope of a hoisting apparatus, and to an arrangement for condition monitoring of a rope of a hoisting apparatus. Said hoisting apparatus is preferably an elevator for transporting passengers and/or goods.

BACKGROUND OF THE INVENTION

An elevator typically comprises an elevator car and a counterweight, which are vertically movable in a hoistway. These elevator units are interconnected to each other by a hoisting roping. The hoisting roping is normally arranged to suspend the elevator units on opposite sides of a drive wheel. For providing force for moving the suspension roping, and thereby also for the elevator units, the elevator comprises a motor for rotating the drive wheel engaging the hoisting roping. The motor is automatically controlled by an elevator control system, whereby the elevator is suitable for automatically serving passengers.

In elevators, the hoisting roping comprises at least one but typically several elevator ropes passing alongside each other. The conventional elevators have steel ropes, but some elevators have ropes that are belt-shaped, i.e. their width is substantially greater than the thickness. As with any other kind of rope, position of the belt-shaped ropes relative to the drive wheel around which it passes (in the axial direction of the drive wheel) so that none of the ropes drifts in said axial direction away from the circumferential surface area of the drive wheel against which the rope in question is intended to rest.

Typically, in prior art, position of ropes in said axial direction has been controlled by providing the drive wheel and the rope engaging the drive wheel with a ribbed or toothed shapes complementary for each other, whereby movement of the rope in said axial direction is blocked by mechanical shape-locking. One alternative way to control position of the belt-shaped ropes in said axial direction is to shape the circumferential surface areas of the drive wheel cambered (also known as crowned). Each cambered circumferential surface area has a convex shape against the peak of which the rope rests. The cambered shape tends to keep the belt-shaped rope passing around it to be positioned such that it rests against the peak thereof, thereby resisting displacement of the rope far away from the point of the peak.

Ropes of a hoisting apparatus typically include one or several load bearing members that are elongated in the longitudinal direction of the rope, each load bearing member forming a structure that continues unbroken throughout the length of the rope. Load bearing members are the members of the rope which are able to bear together the load exerted on the rope in its longitudinal direction. The load, such as a weight suspended by the rope, causes tension on the load bearing member in the longitudinal direction of the rope, which tension can be transmitted by the load bearing member in question all the way from one end of the rope to the other end of the rope. Ropes may further comprise non-bearing components, such as an elastic coating, which cannot transmit tension in the above described way.

In prior art, such ropes exist where the load bearing members are embedded in non-conducting coating, such as polymer coating, forming the surface of the rope and extending between adjacent load bearing members thereby isolating them from each other both mechanically and electrically.

For facilitating awareness of condition of the ropes, and thereby for improving safety of the hoisting apparatus, monitoring of the condition of the load bearing members has been proposed. The visual inspection of the internal tensile elements is generally regarded as impossible and hence the need arises for non-visual inspection. The condition monitoring has been proposed in prior art to be arranged by monitoring electrical parameters of the load bearing members.

One known method for checking the condition of the tensile elements is the resistance-based inspection, which is based on a measure of the electrical resistance of the tensile elements. A change in the electrical resistance or a deviation from an expected value is interpreted as a damage of the tensile elements. There are some drawbacks to this method. It has been found, however, that non negligible damages may nevertheless result in small variations of the electrical resistance of common tensile elements such as steel cords. Consequently, the sensitivity of the resistance-based inspection is not satisfactory.

One prior art method for condition monitoring of a rope is to place an electrically conductive member within the rope. The status of the conductive member may be tested by applying an electrical current to the member. If damage occurs to an extent great enough to break the conductive member, the electrical circuit is broken. There are some drawbacks to this method. In this method there is no qualitative information to indicate if the rope is degrading during use as the first indication is provided by the broken conductive member. Furthermore, the method provides no information on the location of the damage along the length of the rope.

In addition to a damage or defect in the rope, slackness and misalignment of the rope might cause serious problems in use of the hoisting apparatus. A drawback of the known elevators has been that moving of a rope in the axial direction outside its intended course, and further development of the problem into even more hazardous state have not been prevented in an adequately reliable manner. This has been difficult especially with elevators where said mechanical shape-locking between the drive wheel and the rope engaging the drive wheel has been inadequately reliable or unavailable for some reason such as due to preference to utilize cambered shape of the drive wheel for rope position control.

BRIEF DESCRIPTION OF THE INVENTION

The object of the invention is to introduce a method for condition monitoring of a rope of a hoisting apparatus, as well as an arrangement for condition monitoring of a rope of a hoisting apparatus, wherein information is provided on the location of the damage along the length of the rope of a hoisting apparatus. Advantageous embodiments are furthermore presented, inter alia, wherein qualitative information about the damage magnitude is provided.

It is brought forward a new method for condition monitoring of a rope of a hoisting apparatus, which rope comprises one or more conductive load bearing members for bearing the load exerted on the rope in longitudinal direction and extending parallel to each other and to the longitudinal direction of the rope, in which method an alternating magnetic field is generated by an at least one eddy current testing probe placed near said rope, said alternating magnetic field causing eddy currents in said rope, a secondary magnetic field generated by said eddy currents is detected in said rope by said at least one eddy current testing probe as eddy current detection data, and said eddy current detection data is utilized for on-line monitoring of said rope. Hereby, one or more of the above-mentioned advantages and/or objectives are achieved. These advantages and/or objectives are further facilitated with the additional preferred features and/or steps described in the following.

In a preferred embodiment of said method, said eddy current detection data is used for determining of the condition, the position, the alignment or the tension of said moving rope.

In a preferred embodiment of said method, information about the location of a fault and/or damage in the rope is provided and/or one or more parameters for determining the type of a fault and/or damage in the rope is provided.

In a preferred embodiment, information for quantifying the severity of the fault and/or damage such as e.g. fiber damage or delamination is provided.

In a preferred embodiment, after receiving said one or more parameters for the determination of the condition of the rope on-line monitoring actions are performed.

It is also brought forward a new arrangement for condition monitoring of a rope of a hoisting apparatus, which rope comprises one or more conductive load bearing members for bearing the load exerted on the rope in longitudinal direction and extending parallel to each other and to the longitudinal direction of the rope, which arrangement comprises an at least one eddy current testing probe placed near said rope for generating an alternating magnetic field, said alternating magnetic field causing eddy currents in said rope, and for detecting a secondary magnetic field being generated by said eddy currents in said rope as eddy current detection data, and an on-line monitoring unit receiving and utilizing said eddy current detection data for on-line condition monitoring of said rope.

In a preferred embodiment of said arrangement, said on-line monitoring unit comprises a chassis that maintains the position of the probe with regard to the rope.

In a preferred embodiment, said on-line monitoring unit is a movable eddy current testing probe arrangement.

In a preferred embodiment, said movable eddy current testing probe arrangement comprises positioning elements.

In a preferred embodiment, said at least one eddy current testing probe comprises one detecting probe for each conductive load bearing member in said rope.

In a preferred embodiment of said arrangement, said on-line monitoring unit is arranged for using said eddy current detection data for determination of the condition, the position, the alignment or the tension of said rope.

In a preferred embodiment, said rope comprises a non-conductive coating, said one or more conductive load bearing members being embedded in said coating, said coating forming the surface of the rope and extending between adjacent load bearing members thereby isolating them from each other.

In a preferred embodiment, said conductive load bearing members are made of non-metal material, e.g. of composite material comprising electrically conducting reinforcing fibers in polymer matrix, said reinforcing fibers preferably being carbon fibers.

In a preferred embodiment, upon receiving eddy current detection data said on-line monitoring unit is arranged for providing one or more parameters for the determination of the condition, position, alignment or tension of the rope.

In a preferred embodiment, said on-line monitoring unit is arranged for providing for one or more parameters for determining whether there is any fault and/or damage in the rope.

In a preferred embodiment, said on-line monitoring unit is arranged for providing for one or more parameters for determining the type of a fault and/or damage in the rope.

In a preferred embodiment, said on-line monitoring unit is arranged for providing information about the location of any heterogeneity in the rope.

In a preferred embodiment, said on-line monitoring unit is arranged for providing information for quantifying the severity of the defect such as e.g. fiber damage or delamination.

In a preferred embodiment, said rope is belt-shaped, i.e. larger in width direction than thickness direction.

In a preferred embodiment, said on-line monitoring unit is arranged for performing on-line monitoring actions.

In a preferred embodiment, said eddy current testing probe is arranged for carrying out multiple measurements in detecting said eddy currents by changing signal form, signal amplitude and/or signal frequency of said generated alternating magnetic field.

In a preferred embodiment, said eddy current testing probes of said condition monitoring arrangement may be arranged on both sides of the monitored rope or around the monitored rope.

In a preferred embodiment, said eddy current testing probe comprises one or more bridge-type probes and/or one or more reflection-type probes.

In a preferred embodiment, said eddy current testing probe one or more excitation coils and/or excitation filaments and one or more sensing coils and/or sensing filaments.

In a preferred embodiment, said excitation coils and/or said excitation filaments and/or said sensing coils and/or said sensing filaments are arranged so that the excitation direction and/or the sensing direction is parallel to said load bearing members or parallel to individual reinforcing fibers of said load bearing members.

In a preferred embodiment, at least a part of said excitation coils and/or said excitation filaments and/or said sensing coils and/or said sensing filaments is arranged in a perpendicular direction in relation to the load said load bearing members.

In a preferred embodiment, at least a part of said excitation coils and/or said excitation filaments and/or said sensing coils and/or said sensing filaments is arranged as interlacing each other.

In a preferred embodiment, said arrangement comprises a data storage for storing and retrieving said eddy current detection data.

BRIEF DESCRIPTION OF THE DRAWINGS

In the following, the present invention will be described in more detail by way of example and with reference to the attached drawings, in which.

The foregoing aspects, features and advantages of the invention will be apparent from the drawings and the detailed description related thereto.

DETAILED DESCRIPTION

Figure 1:
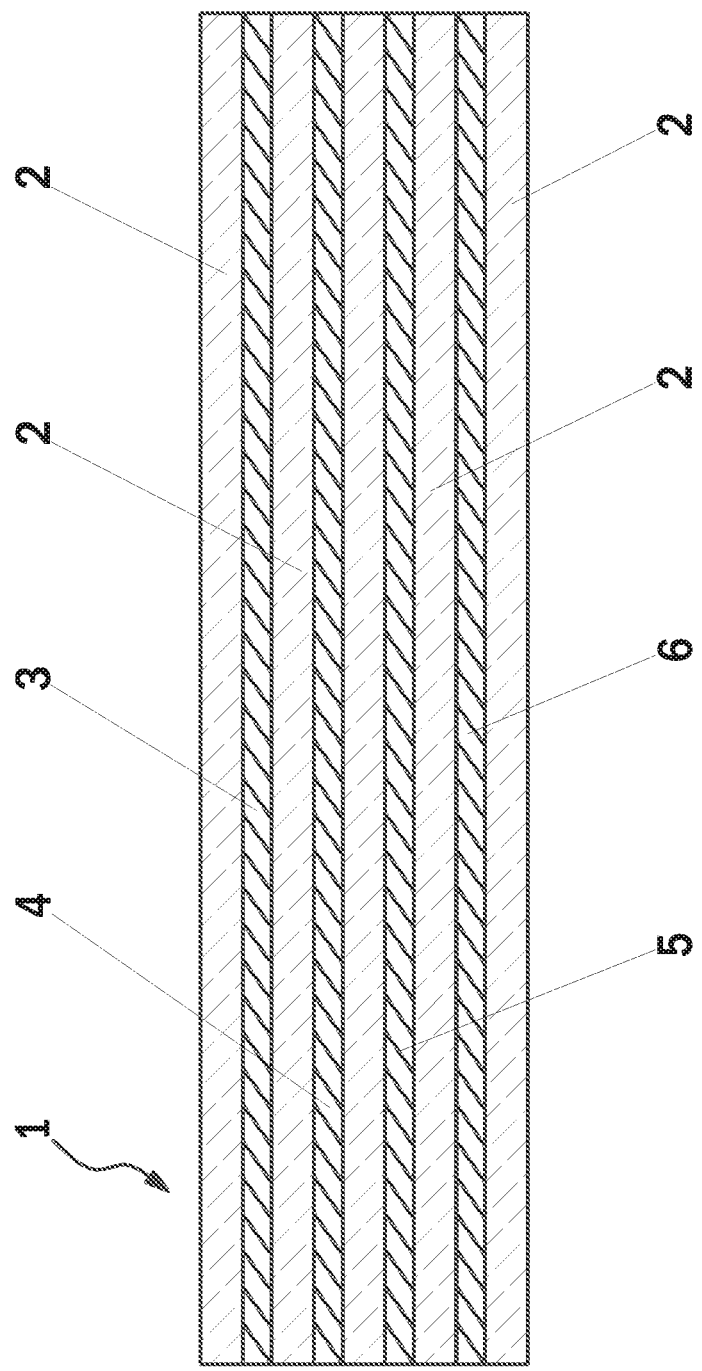
FIG. 1 illustrates a rope of a hoisting apparatus according to one embodiment of the present invention.

FIG. 1 illustrates a rope of a hoisting apparatus according to one embodiment of the present invention. In the presented embodiment, the hoisting rope 1 is belt-shaped, i.e. larger in width direction than thickness direction. The hoisting rope 1 comprises a non-conductive coating 2, and a plurality of conductive load bearing members 3-6 for bearing the load exerted on the hoisting rope 1 in longitudinal direction thereof, which are adjacent in width direction of the hoisting rope 1. The load bearing members 3-6 are embedded in the non-conductive coating 2 and extend parallel to each other as well as to the longitudinal direction of the hoisting rope 1 unbroken throughout the length of the hoisting rope 1. The coating 2 forms the surface of the hoisting rope 1 and extends between adjacent load bearing members 3-6, thereby isolating them from each other both mechanically and electrically. The said conductive load bearing members 3-6 may be made of non-metal material. The said conductive load bearing members 3-6 may be made of composite material comprising electrically conducting reinforcing fibers in polymer matrix, said reinforcing fibers preferably being carbon fibers.

Figure 2:
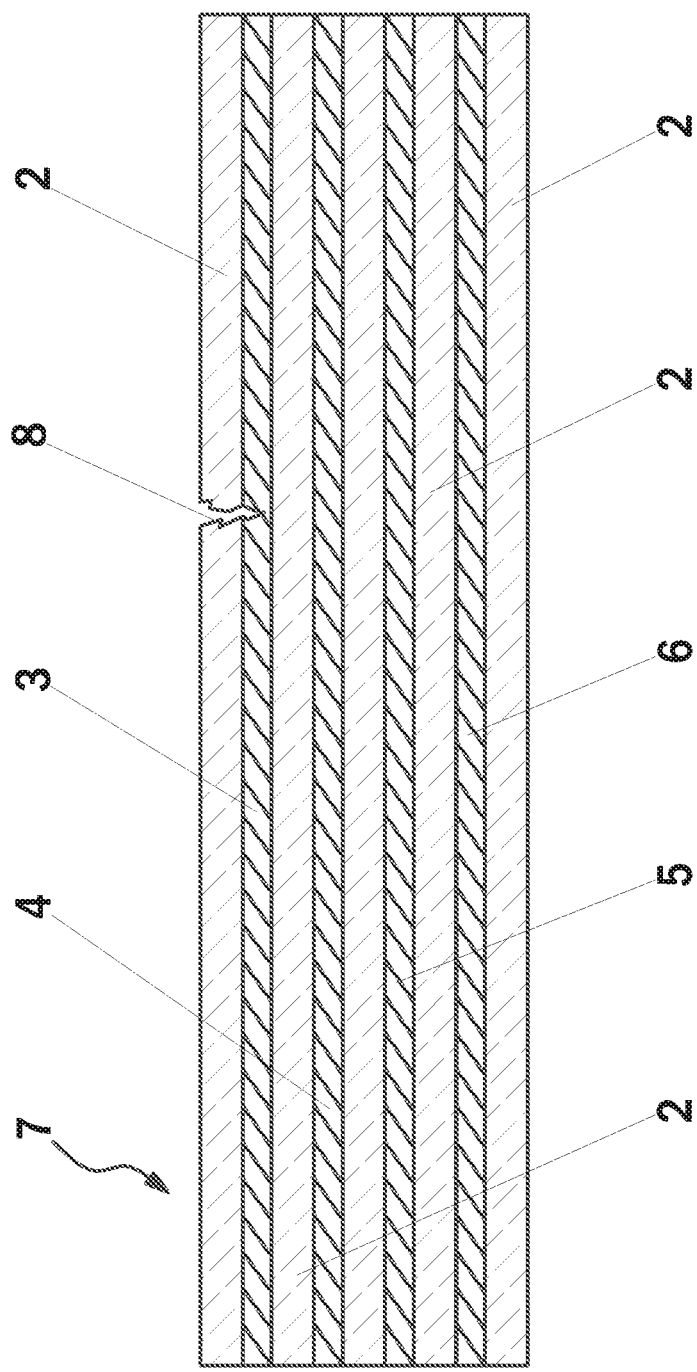
FIG. 2 illustrates a rope of a hoisting apparatus according to one embodiment of the present invention having a defect in the hoisting rope.

FIG. 2 illustrates a rope of a hoisting apparatus according to one embodiment of the present invention having a defect in the hoisting rope. The arrangement for condition monitoring of a hoisting rope of a hoisting apparatus presented in FIG. 2 is similar to that of presented in FIG. 1 with the exception of that there is a defect 8 in a first load bearing member 3 of the defected hoisting rope 7 of FIG. 2. The defected hoisting rope 7 is partially broken from a defect 8 in the middle part of the defected hoisting rope 7.

Figure 3:
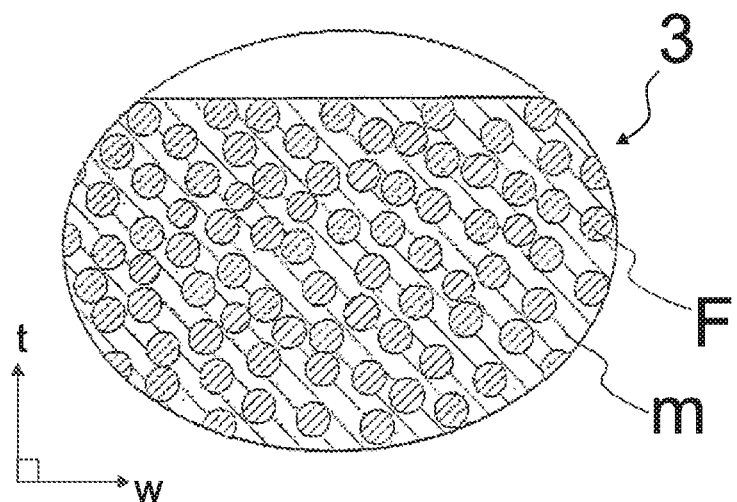
FIG. 3 illustrates a preferred inner structure of the load bearing member according to the present invention.

FIG. 3 illustrates a preferred inner structure of the load bearing member according to the present invention. In FIG. 3 the width direction w and the thickness direction t of a load bearing member 3 is shown. In FIG. 3 the cross section of the load bearing member 3 as viewed in the longitudinal direction I of the load bearing member 3 is shown in particular. The rope could alternatively have some other number of load bearing members 3, either more or less than what is disclosed in the Figures.

The load bearing members 3-6 are made of composite material comprising reinforcing fibers F embedded in polymer matrix m. The reinforcing fibers F are more specifically distributed in polymer matrix m and bound together by the polymer matrix, particularly such that an elongated rod-like piece is formed. Thus, each load bearing member 3-6 is one solid elongated rod-like piece. The reinforcing fibers F are distributed preferably substantially evenly in the polymer matrix m. Thereby a load bearing member with homogeneous properties and structure is achieved throughout its cross section. In this way, it can be also ensured that each of the fibers can be in contact and bonded with the matrix m. Said reinforcing fibers F are most preferably carbon fibers as they are electrically conducting and have excellent properties in terms of load bearing capacity, weight and tensile stiffness, which makes them particularly well suitable for use in elevator hoisting ropes. Alternatively, said reinforcing fibers F can be of any other fiber material which is electrically conducting. The matrix m comprises preferably of epoxy, but alternative materials could be used depending on the preferred properties. Preferably, substantially all the reinforcing fibers F of each load bearing member 3-6 are parallel with the longitudinal direction of the load bearing member 3-6. Thereby the fibers are also parallel with the longitudinal direction of the hoisting rope 1 as each load bearing member is oriented parallel with the longitudinal direction of the hoisting rope 1. Thereby, the fibers in the final hoisting rope 1 will be aligned with the force when the hoisting rope 1 is pulled, which ensures that the structure provides high tensile stiffness. This is also advantageous for achieving unproblematic behavior of the internal structure, particularly internal movement, when the hoisting rope 1 is bent.

The fibers F used in the preferred embodiments are substantially untwisted in relation to each other, which provides them said orientation parallel with the longitudinal direction of the hoisting rope 1. This is in contrast to the conventionally twisted elevator ropes, where the wires or fibers are strongly twisted and have normally a twisting angle from 15 up to 30 degrees, the fiber/wire bundles of these conventionally twisted elevator ropes thereby having the potential for transforming towards a straighter configuration under tension, which provides these ropes a high elongation under tension as well as leads to an unintegral structure.

The reinforcing fibers F are preferably long continuous fibers in the longitudinal direction of the load bearing member, the fibers F preferably continuing for the whole length of the load bearing member 3-6 as well as the hoisting rope 1. Thus, the load bearing ability, good conductivity as well as manufacturing of the load bearing member 3-6 are facilitated. The fibers F being oriented parallel with longitudinal direction of the hoisting rope 1, as far as possible, the cross section of the load bearing member 3-6 can be made to continue substantially the same in terms of its cross-section for the whole length of the hoisting rope 1. Thus, no substantial relative movement can occur inside the load bearing member 3-6 when it is bent.

As mentioned, the reinforcing fibers F are preferably distributed in the aforementioned load bearing member 3-6 substantially evenly, in particular as evenly as possible, so that the load bearing member 3-6 would be as homogeneous as possible in the transverse direction thereof. An advantage of the structure presented is that the matrix m surrounding the reinforcing fibers F keeps the interpositioning of the reinforcing fibers F substantially unchanged. It equalizes with its slight elasticity the distribution of a force exerted on the fibers, reduces fiber-fiber contacts and internal wear of the hoisting rope, thus improving the service life of the hoisting rope 1. The composite matrix m, into which the individual fibers F are distributed as evenly as possible, is most preferably made of epoxy, which has good adhesion to the reinforcement fibers F and which is known to behave advantageously with carbon fiber. Alternatively, e.g. polyester or vinyl ester can be used, but alternatively any other suitable alternative materials can be used. FIG. 3 presents inside the circle a partial cross-section of the load bearing member 3-6 close to the surface thereof as viewed in the longitudinal direction of the hoisting rope 1. The reinforcing fibers F of the load bearing member 3-6 are preferably organized in the polymer matrix m according to this cross-section. The rest (parts not showed) of the load bearing member 3-6 have a similar structure.

Figure 4:
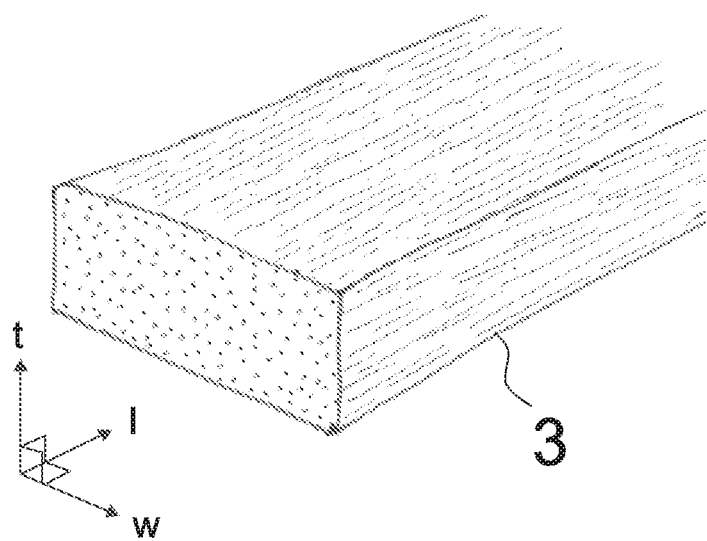
FIG. 4 illustrates a three dimensional view of a section of the load bearing member according to the present invention.

FIG. 4 illustrates a three dimensional view of a section of the load bearing member according to the present invention. From the presented FIG. 3 and FIG. 4 it can also be seen how the individual reinforcing fibers F of a load bearing member 3 are substantially evenly distributed in the polymer matrix m, which surrounds the reinforcing fibers F. The polymer matrix m fills the areas between individual reinforcing fibers F and binds substantially all the reinforcing fibers F that are inside the matrix m to each other as a uniform solid substance. A chemical bond exists between, the individual reinforcing fibers F (preferably each of them) and the matrix m, one advantage of which is uniformity of the structure. To improve the chemical adhesion of the reinforcing fiber to the matrix m, in particular to strengthen the chemical bond between the reinforcing fiber F and the matrix m, each fiber can have a thin coating, e.g. a primer (not presented) on the actual fiber structure between the reinforcing fiber structure and the polymer matrix m. However, this kind of thin coating is not necessary. The properties of the polymer matrix m can also be optimized as it is common in polymer technology. For example, the matrix m can comprise a base polymer material (e.g. epoxy) as well as additives, which fine-tune the properties of the base polymer such that the properties of the matrix are optimized. The polymer matrix m is preferably of a hard non-elastomer as in this case a risk of buckling can be reduced for instance. However, the polymer matrix need not be non-elastomer necessarily, e.g. if the downsides of this kind of material are deemed acceptable or irrelevant for the intended use. In that case, the polymer matrix m can be made of elastomer material such as polyurethane or rubber for instance. The reinforcing fibers F being in the polymer matrix means here that the individual reinforcing fibers F are bound to each other with a polymer matrix m, e.g. in the manufacturing phase by immersing them together in the fluid material of the polymer matrix which is thereafter solidified. In this case the gaps of individual reinforcing fibers bound to each other with the polymer matrix comprise the polymer of the matrix. In this way a great number of reinforcing fibers bound to each other in the longitudinal direction of the hoisting rope are distributed in the polymer matrix. As mentioned, the reinforcing fibers are preferably distributed substantially evenly in the polymer matrix m, whereby the load bearing member is as homogeneous as possible when viewed in the direction of the cross-section of the hoisting rope. In other words, the fiber density in the cross-section of the load bearing member 3-6 does not therefore vary substantially. The individual reinforcing fibers of the load bearing member 3-6 are mainly surrounded with polymer matrix m, but random fiber-fiber contacts can occur because controlling the position of the fibers in relation to each other in their simultaneous impregnation with polymer is difficult, and on the other hand, perfect elimination of random fiber-fiber contacts is not necessary from the viewpoint of the functioning of the solution. If, however, it is desired to reduce their random occurrence, the individual reinforcing fibers F can be pre-coated with material of the matrix m such that a coating of polymer material of said matrix is around each of them already before they are brought and bound together with the matrix material, e.g. before they are immersed in the fluid matrix material.

In the case of delamination of a load bearing member 3-6 the polymer matrix no longer supports all of the individual reinforcing fibers in a load bearing member 3-6. Consequently, in delamination some of said individual reinforcing fibers detach from one another in the longitudinal direction.

As above mentioned, the matrix m of the load bearing member 3-6 is most preferably hard in its material properties. A hard matrix m helps to support the reinforcing fibers F, especially when the hoisting rope bends, preventing buckling of the reinforcing fibers F of the bent rope, because the hard material supports the fibers F efficiently. To reduce the buckling and to facilitate a small bending radius of the load bearing member 3-6, among other things, it is therefore preferred that the polymer matrix m is hard, and in particular non-elastomeric. The most preferred materials for the matrix are epoxy resin, polyester, phenolic plastic or vinyl ester. The polymer matrix m is preferably so hard that its module of elasticity E is over 2 GPa, most preferably over 2.5 GPa. In this case the module of elasticity E is preferably in the range 2.5-10 GPa, most preferably in the range 2.5-3.5 GPa. There are commercially available various material alternatives for the matrix m which can provide these material properties.

Preferably over 50% of the surface area of the cross-section of the load bearing member 3-6 is of the aforementioned electrically conducting reinforcing fiber. Thereby, good conductivity can be ensured. Fibers F will be in contact with each other randomly along their length whereby magnetic fields signal inserted into the load bearing member remains within substantially the whole cross section of the load bearing member. To be more precise preferably 50%-80% of the surface area of the cross-section of the load bearing member 3-6 is of the aforementioned reinforcing fiber, most preferably such that 55%-70% is of the aforementioned reinforcing fiber, and substantially all the remaining surface area is of polymer matrix. In this way conductivity and longitudinal stiffness of the load bearing member 3-6 are facilitated yet there is enough matrix material to bind the fibers F effectively to each other. Most preferably, this is carried out such that approx. 60% of the surface area is of reinforcing fiber and approx. 40% is of matrix material.

Figure 5A:
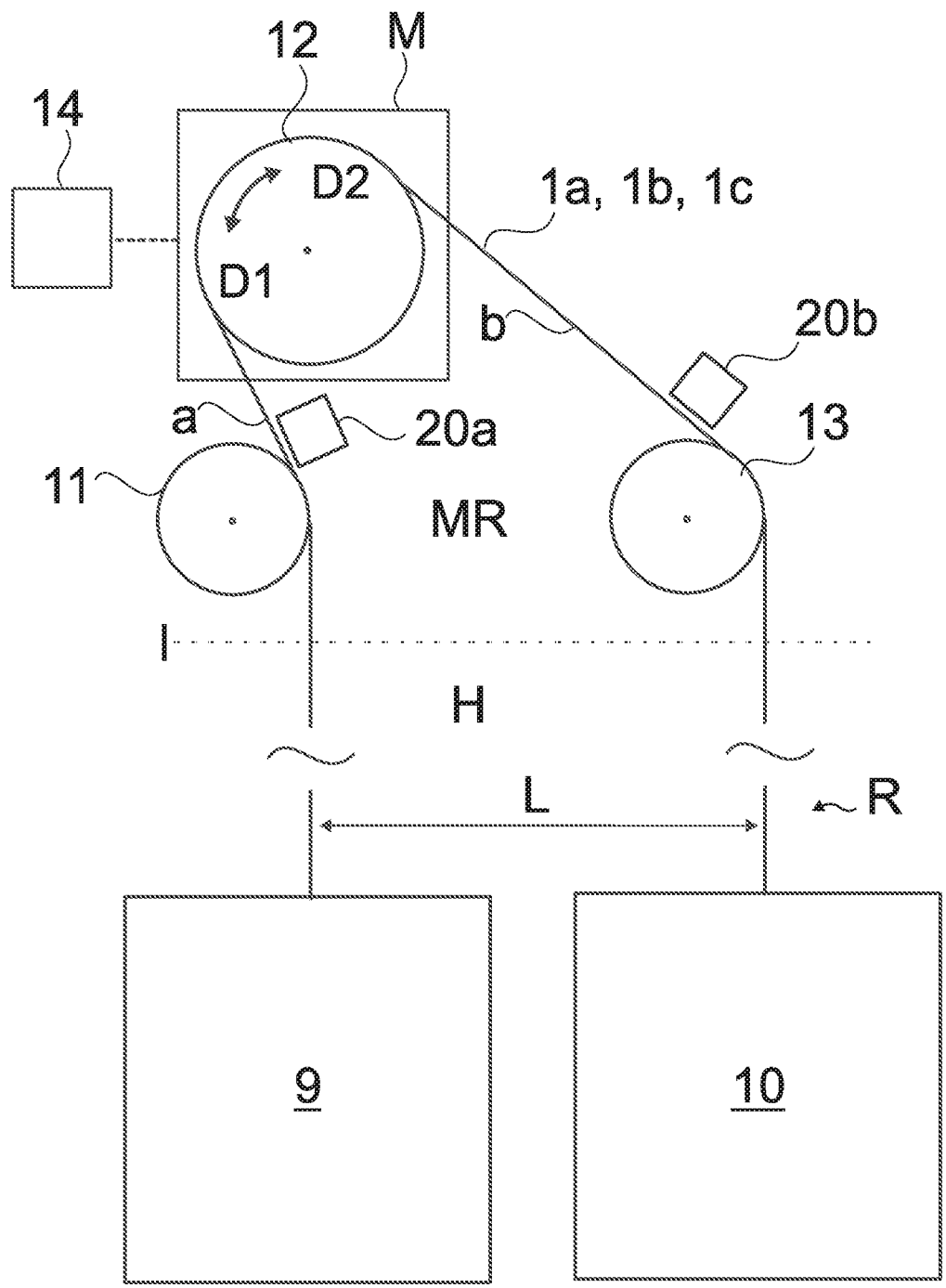
FIG. 5A illustrates a condition monitoring arrangement of an elevator according to one embodiment of the present invention.

FIG. 5A illustrates a condition monitoring arrangement of an elevator according to one embodiment of the present invention. The elevator comprises a hoistway H and a first elevator unit 9 vertically movable in the hoistway H and a second elevator unit 10 vertically movable in the hoistway H. At least one of said elevator units 9, 10 is an elevator car for receiving a load to be transported i.e. goods and/or passengers. The other one is preferably a counterweight, but alternatively it could be a second elevator car.

The elevator further comprises a hoisting roping R comprising one or more ropes 1a, 1b, 1c, i.e. one or more belt-shaped hoisting ropes 1a, 1b, 1c, interconnecting the first elevator unit 9 and the second elevator unit 10 and passing around rope wheels 11, 12, 13, said rope wheels 11, 12, 13 having parallel rotational axes.

For moving the one or more belt-shaped hoisting ropes 1a, 1b, 1c, and thereby also for moving the elevator units 9, 10, said rope wheels 11, 12, 13 include a drive wheel 12. Each of said one or more belt-shaped hoisting ropes 1a, 1b, 1c passes around the drive wheel 12 and comprises consecutively a first rope section a extending between the drive wheel 12 and the first elevator unit 9, and a second rope section b extending between the drive wheel 12 and the second elevator unit 10. Thus, each said first rope section a is on one side of the drive wheel and each said second rope section b is on the other (opposite) side of the drive wheel 12. The elevator comprises a motor M for rotating the drive wheel 12 engaging the one or more hoisting ropes 1a, 1b, 1c whereby motorized rotation of the drive wheel 12 is enabled. In FIG. 5A, the two rotation directions D1, D2 of the drive wheel 12 are marked as D1 and D2. The elevator further comprises an automatic elevator control 14 arranged to control the motor M. Thereby movement of the elevator units 9, 10 is automatically controllable.

In the presented embodiment, the elevator further comprises a non-driven, i.e. freely rotating, first cambered diverting wheel 11 in proximity of the drive wheel 12. Each said first rope section a is arranged to pass around the first non-driven cambered diverting wheel 11, in particular resting against a cambered circumferential surface area A, B, C thereof. In the embodiment illustrated, the elevator further comprises a non-driven, i.e. freely rotating, second cambered diverting wheel 13 in proximity of the drive wheel 12. Each said second rope section b is arranged to pass around the second non-driven cambered diverting wheel 13, in particular resting against a cambered circumferential surface area A, B, C thereof. Thereby, rope sections on both sides of the drive wheel 12 are diverted by a non-driven cambered diverting wheel. The rope extending between the first elevator unit 9 and the second elevator unit 10 passes around the first non-driven cambered diverting wheel 11, a drive wheel 12, and a second non-driven cambered diverting wheel 13, in this order. Thereby, arrival of the rope to the drive wheel 12 as well as departure of the rope from the drive wheel 12 is controlled in terms of its axial position independently of drive direction. In FIG. 5A, the horizontal distance (L-distance) between the vertically oriented rope section extending between the first cambered diverting wheel 11 and the first elevator unit 9 and the vertically oriented rope section extending between the second non-driven cambered diverting wheel 13 and the second elevator unit 10 is marked with L. In FIG. 5A, a machine room MR is formed above the hoistway H, where the elevator units 9 and 10 travel. Dashed line I represents the floor line of the machine room MR. It is of course obvious, that the elevator could alternatively be implemented without a machine room and/or such that the elevator units travel in different hoistways.

The elevator according to the present invention further comprises a condition monitoring arrangement configured to monitor the condition, the position, the tension and the alignment, i.e. displacement, of each of said rope sections a, b in the axial direction of the rope wheels 11, 12, 13. The rope 1a, 1b, 1c of the elevator comprises one or more conductive load bearing members for bearing the load exerted on the rope 1 in longitudinal direction and extending parallel to each other and to the longitudinal direction of the rope 1. Said condition monitoring arrangement comprises an at least one eddy current testing probe 20a, 20b, and an on-line monitoring unit.

In the condition monitoring arrangement according to the present invention said at least one eddy current testing probe 20a, 20b is placed near said rope 1a, 1b, 1c for generating an alternating magnetic field, said alternating magnetic field causing eddy currents in said rope 1a, 1b, 1c, and for detecting a secondary magnetic field being generated by said eddy currents in said rope 1a, 1b, 1c as eddy current detection data. In the condition monitoring arrangement according to the present invention said on-line monitoring unit is arranged to receive and utilize said eddy current detection data for on-line condition monitoring of said rope 1a, 1b, 1c.

In the embodiment of the present invention presented in FIG. 5A the condition monitoring arrangement is configured to monitor the condition, the position, the tension and the alignment of each of said first rope sections a as defined with at least one first eddy current testing probe 20a, and displacement of each of said second rope sections b as defined with at least one second eddy current testing probe 20b. Accordingly, the condition of first and second rope sections is monitored with separate eddy current testing probes. Said condition monitoring arrangement comprises a first eddy current testing probe 20a configured to detect displacement of each of said first rope sections a in the axial direction of the rope wheels 11, 12, 13 away from a predefined zone and a second eddy current testing probe 20b configured to detect displacement of each of said second rope sections b in the axial direction of the rope wheels 11, 12, 13 away from a predefined zone. In the condition monitoring arrangement according to the present invention said at least one eddy current testing probe 20a, 20b may be positioned close to the drive wheel 12.

With the help of said eddy current detection data an on-line monitoring unit of said condition monitoring arrangement is able determine the types of the defects and condition as well as the position, the alignment and the tension of the hoisting rope 1. Furthermore, said eddy current detection data may provide said on-line monitoring unit information about the location of a fault and/or damage so as to determine said location of the fault and/or damage. Furthermore, said eddy current detection data may provide said on-line monitoring unit information for quantifying the severity of the fault and/or damage such as e.g. fiber damage or delamination. Each one of said eddy current testing probes 20a, 20b may comprise several detecting probes. The eddy current testing probes 20a, 20b may be arranged as a permanent installation or alternatively as movable eddy current testing probes or as portable eddy current testing probes. Even when arranged as a permanent installation the eddy current testing probes 20a, 20b may still be arranged as movable, i.e. positionable, in relation to the monitored rope 1.

The eddy current testing probes 20a, 20b of said condition monitoring arrangement may be arranged on both sides of the monitored rope 1 or arranged around the monitored rope 1. The eddy current testing probes 20a, 20b may comprise one or more hinges for allowing proper positioning of said probes 20a, 20b. The eddy current testing probes 20a, 20b of said condition monitoring arrangement may be arranged to carry out measurements in detecting said secondary magnetic field. Each of said eddy current testing probe may comprise one or more bridge-type probes and/or one or more reflection-type probes. Each of said eddy current testing probe may comprise one or more excitation coils and/or excitation filaments and one or more sensing coils and/or sensing filaments.

The excitation coils and/or the excitation filaments and/or the sensing coils and/or the sensing filaments may be arranged in a planar arrangement so that the excitation direction and/or the sensing direction is parallel to the load bearing members 3-6 of the monitored rope 1 or parallel to individual reinforcing fibers F of the load bearing members 3-6 of the monitored rope 1. Said planar arrangement may also be arranged as parallel to a plane formed by adjacent load bearing members 3-6 of a monitored rope 1. The excitation coils and/or the excitation filaments and/or the sensing coils and/or the sensing filaments may also be arranged in a three-dimensional arrangement so that the excitation direction the sensing direction is parallel to the load bearing members 3-6 of the monitored rope 1. In a three-dimensional arrangement, at least a part of the excitation coils and/or the excitation filaments and/or the sensing coils and/or the sensing filaments may also be arranged in a perpendicular direction in relation to the load bearing members 3-6 of the monitored rope 1. This helps especially in the detection of delamination of the load bearing members 3-6 of the monitored rope 1. Furthermore, at least a part of the excitation coils and/or the excitation filaments and/or the sensing coils and/or the sensing filaments may also be arranged in a perpendicular direction in relation to the plane formed by adjacent load bearing members 3-6 of a monitored rope 1.

Furthermore, at least a part of the excitation filaments and/or the sensing filaments may also be arranged parallel to the load bearing members 3-6 of the monitored rope 1 or parallel to individual reinforcing fibers F of the load bearing members 3-6 of the monitored rope 1. Furthermore, at least a part of the excitation coils and/or the excitation filaments and/or the sensing coils and/or the sensing filaments may also be arranged as interlacing each other. This reduces disturbances in the measurement of adjacent load bearing members 3-6 of the monitored rope 1.

Said excitation coils and/or sensing coils may have a width of less than or equal to the width of said rope 1. Said eddy current testing probes 20a, 20b of said condition monitoring arrangement may have different shapes, forms or geometries, including planar shapes and three-dimensional (3D) shapes. Said eddy current testing probes 20a, 20b may be used without contact to said rope, e.g. within a measurement distance of less than 10 mm from said rope. Said eddy current testing probes 20a, 20b may have an inspection speed of less than 22 m/s. Said eddy current testing probes 20a, 20b may have a detecting frequency of 2 kHz-30 MHz. Said condition monitoring arrangement may also comprise a data storage for storing and retrieving said eddy current detection data.

Figure 5B:
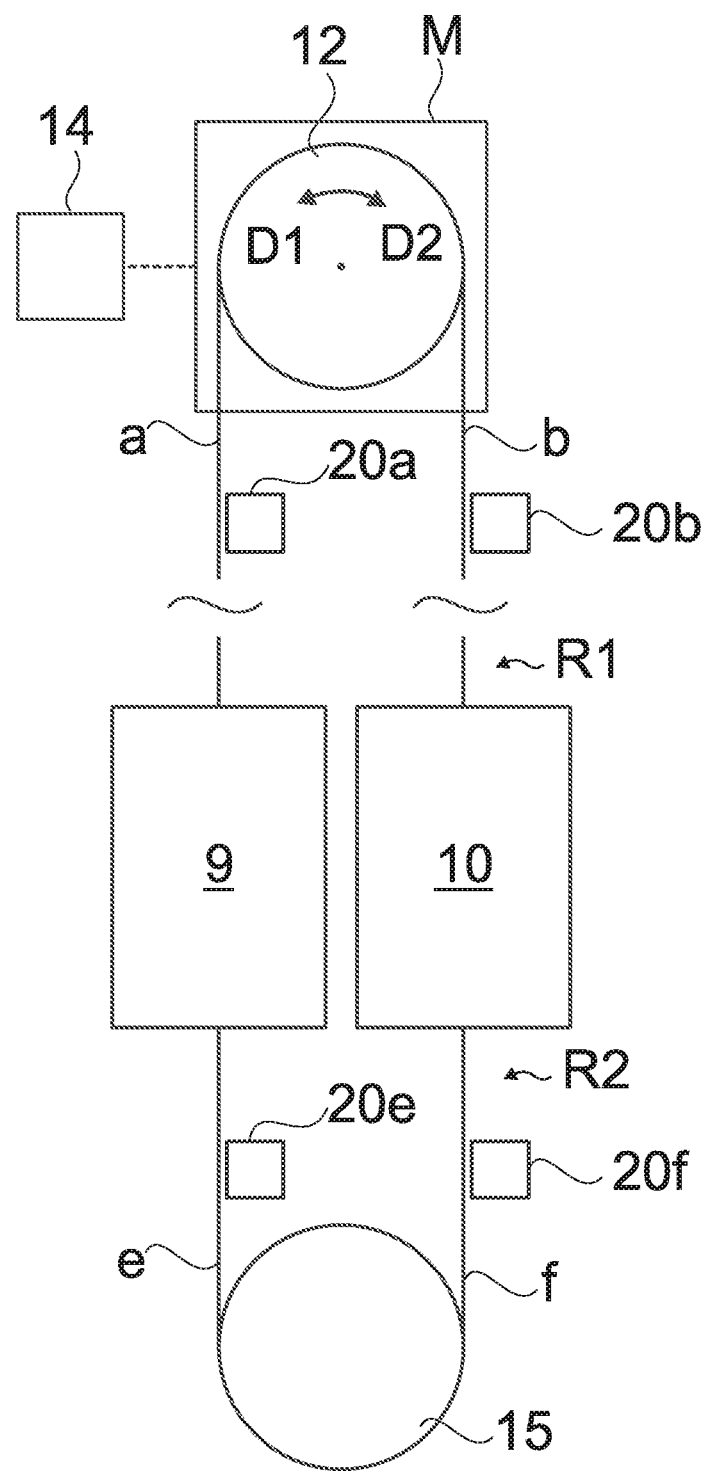
FIG. 5B illustrates a condition monitoring arrangement of an elevator according to another embodiment of the present invention.

FIG. 5B illustrates a condition monitoring arrangement of an elevator according to another embodiment of the present invention. The elevator comprises a hoistway and a first elevator unit 9 vertically movable in the hoistway and a second elevator unit 10 vertically movable in the hoistway. The elevator further comprises a first roping R1 comprising one or more ropes, i.e. one or more belt-shaped hoisting ropes, interconnecting the first elevator unit 9 and the second elevator unit 10 and passing around a drive wheel 12. The elevator further comprises a second roping R2 comprising one or more ropes, i.e. one or more belt-shaped hoisting ropes, interconnecting the first elevator unit 9 and the second elevator unit 10 and passing around a compensation wheel 15.

Each of said one or more belt-shaped ropes of said first roping R1 passes around the drive wheel 12 and comprises consecutively a first rope section a extending between the drive wheel 12 and the first elevator unit 9, and a second rope section b extending between the drive wheel 12 and the second elevator unit 10. Thus, each said first rope section a is on one side of the drive wheel and each said second rope section b is on the other (opposite) side of the drive wheel 12. The elevator comprises a motor M for rotating the drive wheel 12 engaging the one or more hoisting ropes whereby motorized rotation of the drive wheel 12 is enabled. In FIG. 5B, the two rotation directions D1, D2 of the drive wheel 12 are marked as D1 and D2. The elevator further comprises an automatic elevator control 14 arranged to control the motor M. Thereby movement of the elevator units 9, 10 is automatically controllable.

Each of said one or more belt-shaped ropes of said second roping R2, i.e. compensation roping R2, passes around the compensation wheel 15 and comprises consecutively a third rope section e extending between the compensation wheel 15 and the first elevator unit 9, and a fourth rope section f extending between the compensation wheel 15 and the second elevator unit 10. Thus, each said first rope section e is on one side of the compensation wheel and each said second rope section f is on the other (opposite) side of the compensation wheel 15.

The elevator according to the present embodiment further comprises a condition monitoring arrangement configured to monitor the condition, the position, the tension and the alignment, i.e. displacement, of each of said rope sections a, b, e, f in the axial direction of the rope wheels 12, 15. Said condition monitoring arrangement comprises an at least one eddy current testing probe 20a, 20b, 20e, 20f, and an on-line monitoring unit.

In the embodiment of the present invention presented in FIG. 5B the condition monitoring arrangement is configured to monitor the condition, the position, the tension and the alignment of each of said first rope sections a as defined with at least one first eddy current testing probe 20a, and displacement of each of said second rope sections b as defined with at least one second eddy current testing probe 20b. Respectively, the condition monitoring arrangement is configured to monitor the condition, the position, the tension and the alignment of each of said third rope sections e as defined with at least one first eddy current testing probe 20e, and displacement of each of said second rope sections f as defined with at least one second eddy current testing probe 20f. Accordingly, the condition of each rope section is monitored with separate eddy current testing probes. In the condition monitoring arrangement according to the present invention said at least one eddy current testing probe 20a, 20b, 20e, 20f may be positioned close to the rope wheels 12, 15. The eddy current testing probes 20a, 20b, 20e, 20f of said condition monitoring arrangement may be arranged on both sides of the monitored rope or arranged around the monitored rope.

In addition to monitoring the condition of hoisting roping and compensation roping, the condition monitoring arrangement according to the present invention may be arranged to monitor the condition, the position, the tension and the alignment of an overspeed governor roping.

Figure 6:
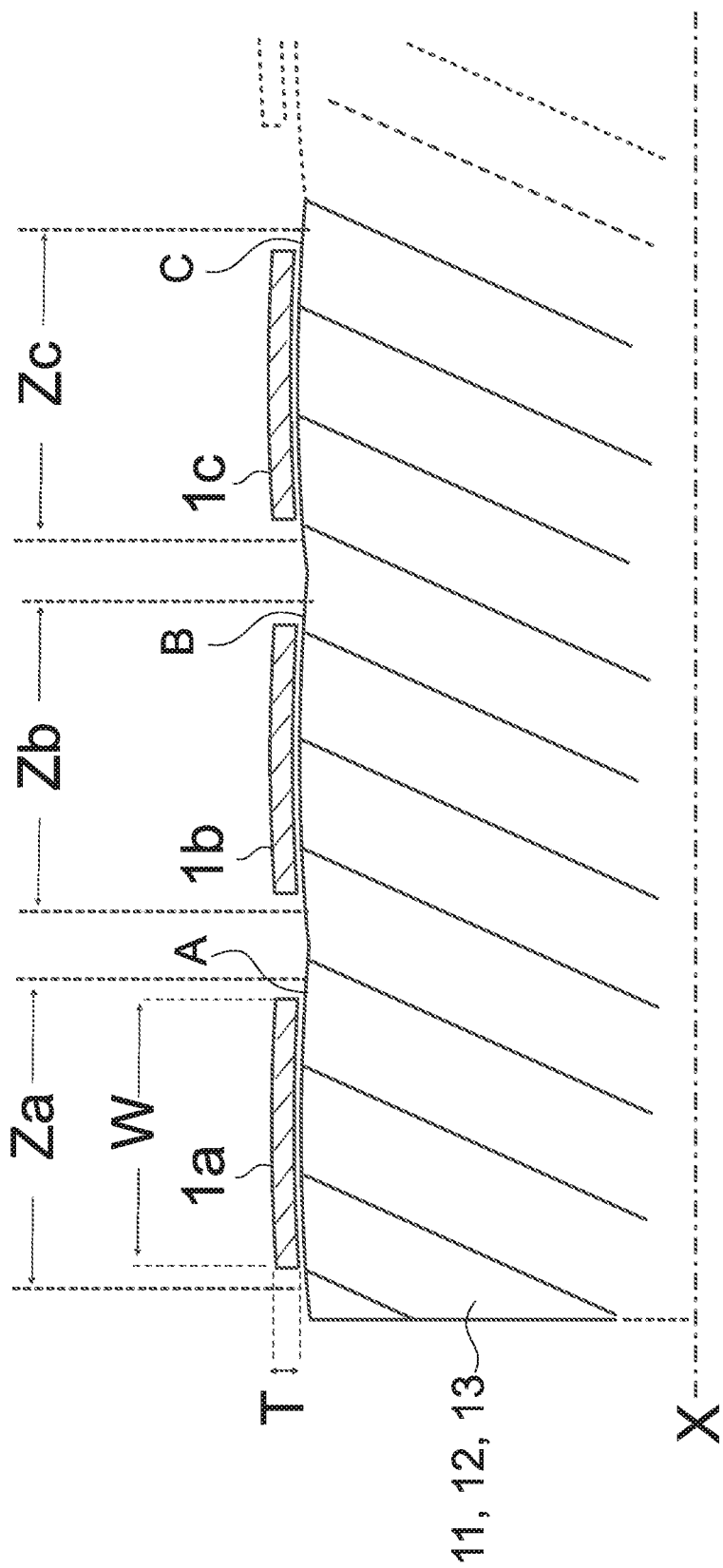
FIG. 6 illustrates a cross sectional view of the passage of the ropes around the rope wheels according to one embodiment of the present invention.

FIG. 6 illustrates a cross sectional view of the passage of the ropes around the rope wheels according to one embodiment of the present invention. FIG. 6 shows a cross sectional view of the ropes as they are positioned against each wheel and the passage of the ropes around said wheels 11, 12, 13. The drive wheel 12 is in the preferred embodiment also cambered in the same way as the non-driven cambered diverting wheels 11, 13. The non-driven cambered diverting wheels 11, 12, 13 comprise a cambered circumferential surface area A, B, C for each of said one or more ropes 1a, 1b, 1c against which circumferential surface area A, B, C the rope in question is arranged to rest. In this way, the position of each belt-shaped rope in axial direction of the wheels 11, 12, 13 around which it passes, is controlled. In these embodiments, each cambered circumferential surface area A, B, C has a convex shape against the peak of which the rope rests. The cambered shape tends to keep the rope passing around it positioned resting against the peak thereof, thereby resisting displacement of the rope 1a, 1b, 1c away from this position in said axial direction X.

The elevator further comprises a condition monitoring arrangement configured to monitor the condition, the position, the tension and the alignment, i.e. displacement, of each of said first rope sections a, b in the axial direction of the rope wheels 11, 12, 13 away from a predefined zone Za, Zb, Zc and displacement of each of the second rope sections in the axial direction of the wheels 11, 12, 13 away from a predefined zone Za, Zb, Zc.

In the embodiment presented, the hoisting ropes 1a, 1b, 1c are more specifically suspension ropes, and for this purpose arranged to suspend the first and second elevator unit 9, 10. In this case, the rope wheels 11, 12, 13 are mounted in the upper end of the hoistway H or in proximity thereof, e.g. in a machine room formed above or beside the upper end of the hoistway. The two elevator units 9, 10 form a balancing weight for each other whereby they are economical to move. In FIG. 6, a machine room MR is formed above the hoistway H, where the elevator units 9 and 10 travel. Dashed line I represents the floor line of the machine room MR. It is of course obvious, that the elevator could alternatively be implemented without a machine room and/or such that the elevator units travel in different hoistways.

In general, it is possible that said one or more belt-shaped suspension ropes 1a, 1b, 1c comprises only one of these ropes arranged as defined, but preferably said one or more belt-shaped hoisting ropes comprises plurality of belt-shaped hoisting ropes. In the embodiment illustrated, there are at least three of belt-shaped hoisting ropes. The ropes being belt-shaped they have two wide sides facing in thickness direction of the rope (in FIG. 6 upwards and downwards), as well as lateral flanks facing in width direction of the rope (in FIG. 6 left and right). Each rope 1a, 1b, 1c passes around the diverting wheels 11, 13 and the drive wheel 12 a wide side of the rope against the wheel in question. When there are several ropes, as illustrated, the ropes 1a, 1b, 1c pass around the diverting wheels 11, 13 and the drive wheel 12 adjacent each other in said axial direction of the wheels 11, 12, 13 as well as adjacent each other in the width-direction W of the ropes.

Preferably, the circumferential surface area A, B, C as well as the surface of the rope via which the rope rest against the circumferential surface area A, B, C in question are both smooth such that neither of said circumferential surface area A, B, C nor the rope has protrusions extending into recesses of the other. Thereby, the control of axial position of each rope is provided by the shape of the cambered circumferential surface area A, B, C against which the rope rests. In addition, traction of each rope is based on frictional contact between the drive wheel 12 and the rope. Therefore, not said circumferential surface area nor the rope surface need not be configured for engaging to each other via a polyVee- or toothed engagement.

Figure 7A:
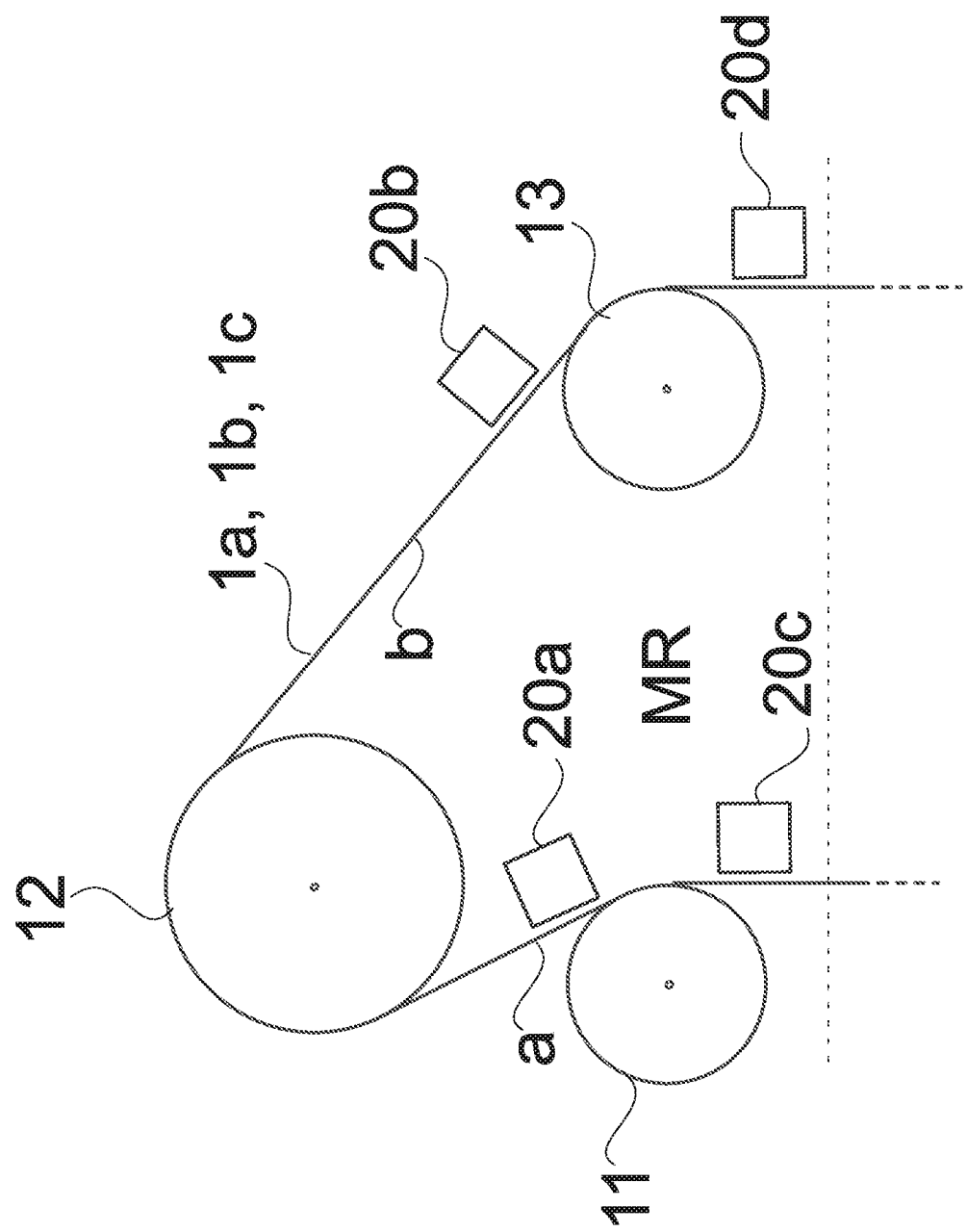
FIG. 7A illustrates a condition monitoring arrangement of an elevator according to a third embodiment of the present invention.

FIG. 7A illustrates a condition monitoring arrangement of an elevator according to a third embodiment of the present invention. In a third embodiment of the present invention the rope monitoring arrangement comprises two first eddy current testing probes 20a, 20c configured to monitor the condition, the tension, the position and the alignment, i.e. displacement, of each of said first rope sections a in the axial direction of the wheels 11, 12, 13 away from a predefined zone. Respectively, in another embodiment of the present invention, the rope monitoring arrangement comprises two second eddy current testing probes 20b, 20d configured to monitor the condition, the tension, the position and the alignment, i.e. displacement, of each of said second rope sections b in the axial direction of the wheels 11, 12, 13 away from a predefined zone.

In the embodiment presented, said two first eddy current testing probes 20a, 20c are focused to monitor the condition of first rope sections before and after the first diverting wheel (as viewed in longitudinal of the ropes). Respectively, said two second eddy current testing probes 20b, 20d are focused to detect displacement of second rope sections before and after the second diverting wheel (as viewed in longitudinal of the ropes). Dashed line represents the floor line of the machine room MR. Each one of said eddy current testing probes 20a, 20b, 20c, 20d may comprise several detecting probes. The eddy current testing probes 20a, 20b, 20c, 20d may be arranged as a permanent installation or alternatively as movable eddy current testing probes or as portable eddy current testing probes. Even when arranged as a permanent installation the eddy current testing probes 20a, 20b, 20c, 20d may still be arranged as movable, i.e. positionable, in relation to the monitored rope 1.

Figure 7B:
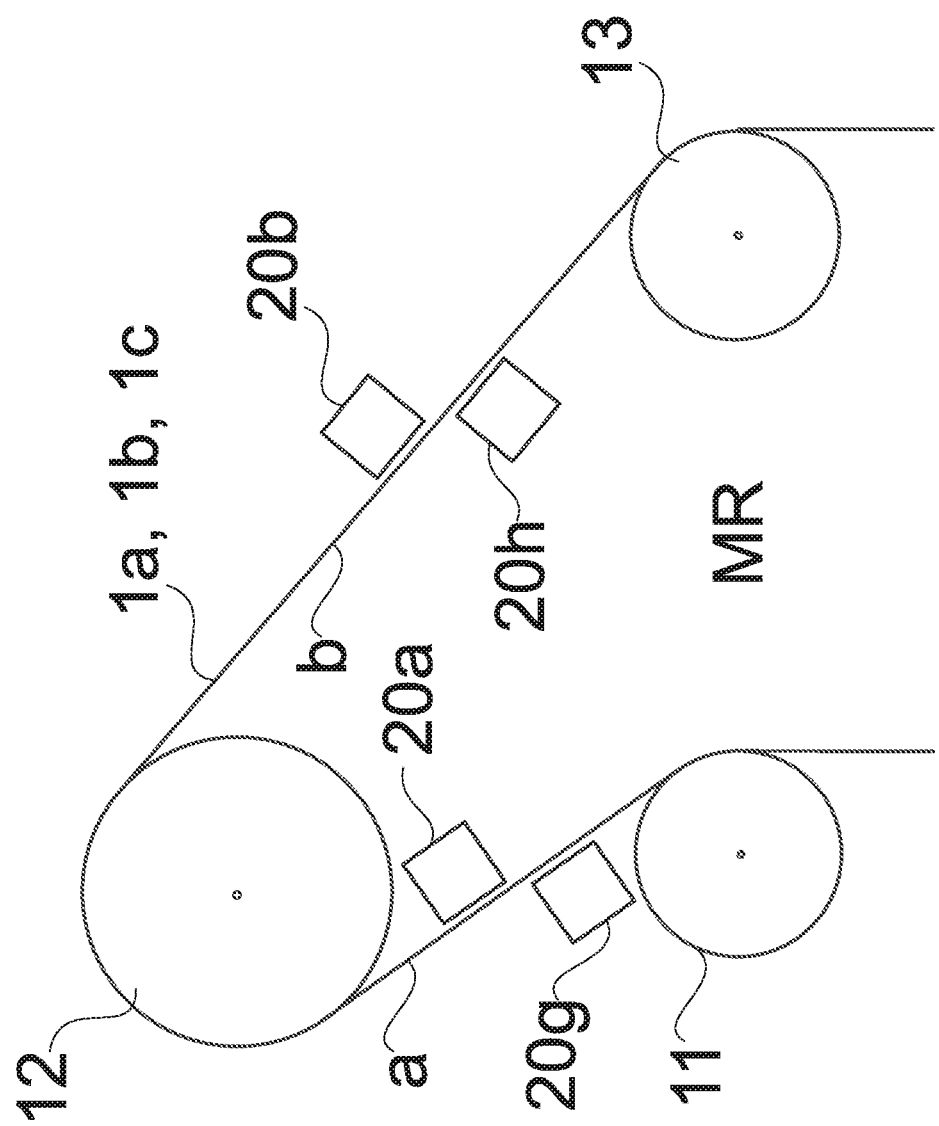
FIG. 7B illustrates a condition monitoring arrangement of an elevator according to a fourth embodiment of the present invention.

FIG. 7B illustrates a condition monitoring arrangement of an elevator according to a fourth embodiment of the present invention. In a fourth embodiment of the present invention the rope monitoring arrangement comprises two first eddy current testing probes 20a, 20g in opposite sides of the monitored rope 1a, 1b, 1c, configured to monitor the condition, the tension, the position and the alignment, i.e. displacement, of each of said first rope sections a in the axial direction of the wheels 11, 12, 13 away from a predefined zone. Respectively, in the present embodiment, the rope monitoring arrangement comprises two second eddy current testing probes 20b, 20h in opposite sides of the monitored rope 1a, 1b, 1c, configured to monitor the condition, the tension, the position and the alignment, i.e. displacement, of each of said second rope sections b in the axial direction of the wheels 11, 12, 13 away from a predefined zone. In the condition monitoring arrangement according to the present embodiment said at least one eddy current testing probes 20a, 20b, 20g, 20h may be positioned close to the drive wheel 12.

Figure 8:
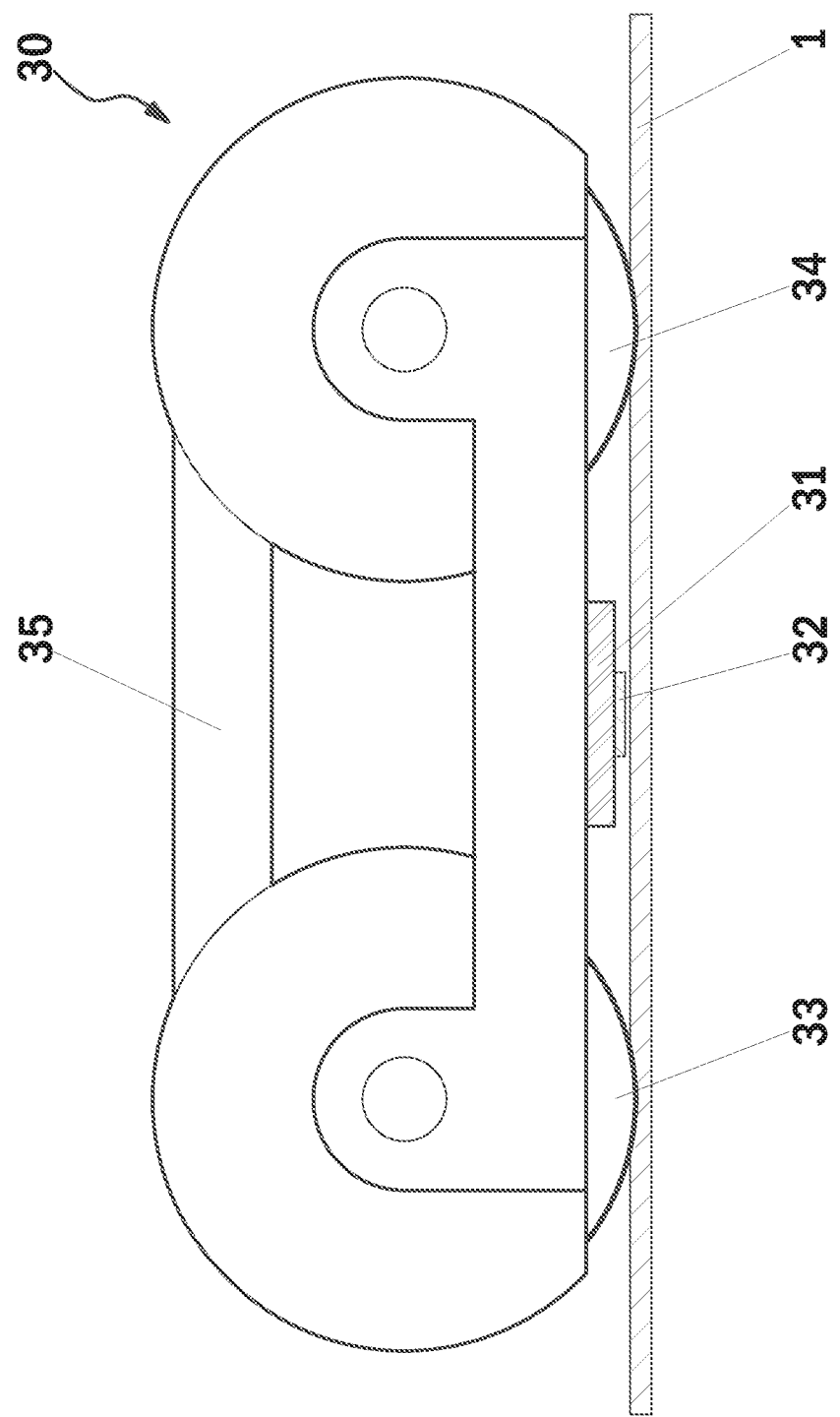
FIG. 8 illustrates a movable eddy current testing probe arrangement according to an embodiment of the present invention.

FIG. 8 illustrates a movable eddy current testing probe arrangement according to an embodiment of the present invention. In the presented embodiment the movable eddy current testing probe arrangement 30 comprises an at least one eddy current testing probe 31 and a movable probe enclosure 35. Each one of said at least one eddy current testing probes 31 comprises an at least one detecting probe 32. The movable eddy current testing probe arrangement 30 may be used for condition monitoring of a rope 1 of a hoisting apparatus, e.g. elevator. The movable eddy current testing probe arrangement 30 may a handle. The movable eddy current testing probe arrangement 30 comprises positioning elements 33, 34, e.g. positioning wheels 33, 34, for appropriate positioning of said movable eddy current testing probe arrangement 30 in relation to the monitored rope 1.

In the movable eddy current testing probe arrangement according to an embodiment of the present invention said at least one eddy current testing probes 31 may e.g. comprise one detecting probe 32 for each conductive load bearing member in the monitored rope 1. In an alternative embodiment, the movable eddy current testing probe arrangement 30 may comprise optical positioning elements for appropriate positioning of said movable eddy current testing probe arrangement 30 in relation to the monitored rope 1. Said movable eddy current testing probe arrangement 30 comprises an at least one eddy current testing probe.

Figure 9:
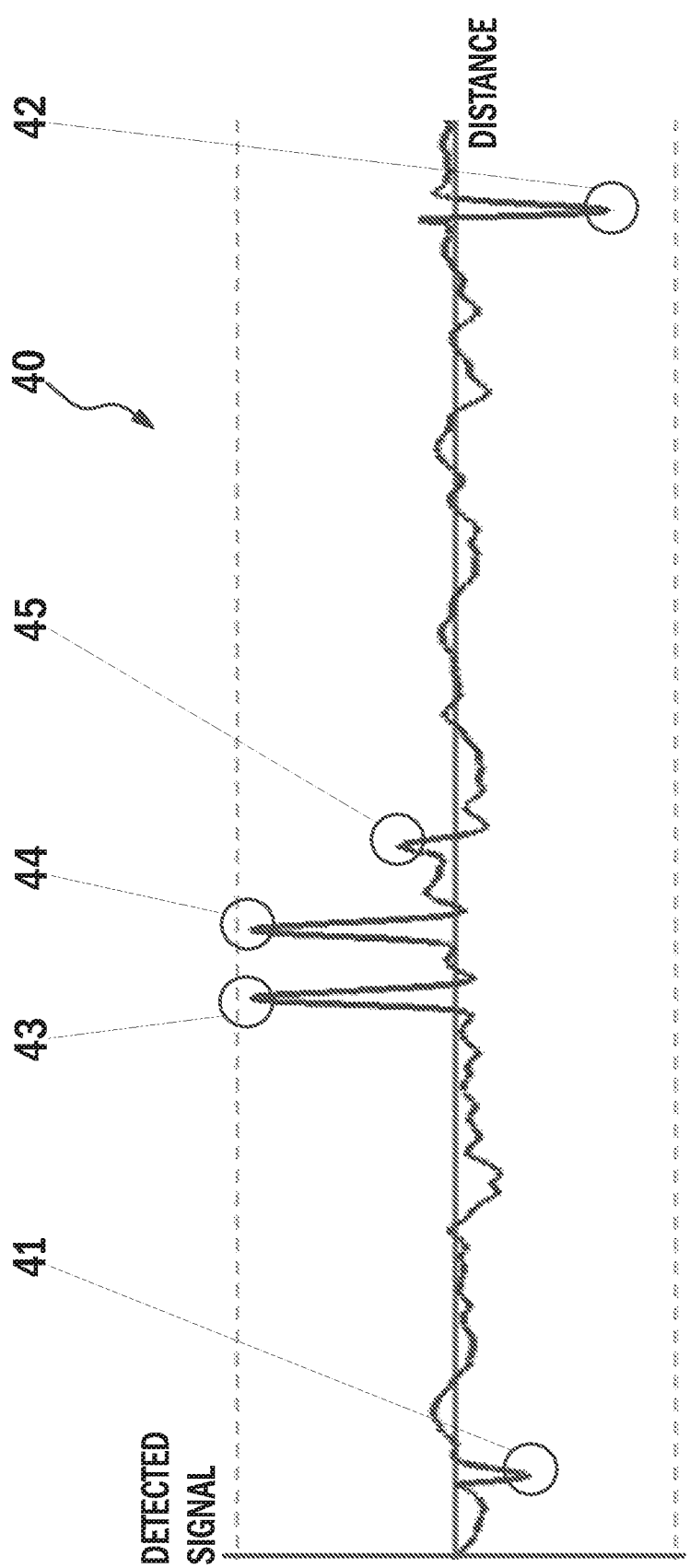
FIG. 9 illustrates an example of a detected electromagnetic signal according to one embodiment of the present invention having defects in the rope.

FIG. 9 illustrates an example of a detected electromagnetic signal according to one embodiment of the present invention having defects in the rope. In FIG. 9 there is illustrated an example of the change of the electromagnetic signal along longitudinal direction of the rope, according to one embodiment of the present invention, allowing the detection of defects in the rope, due to electromagnetic signal variations. In the example shown in FIG. 9 a defected moving rope 1 is monitored with a movable eddy current testing probe arrangement 30. In the test arrangement, an alternating magnetic field is generated by an eddy current testing probe of said movable eddy current testing probe arrangement 30 placed near moving rope 1, said alternating magnetic field causing eddy currents in said moving rope 1. Consequently, a secondary magnetic field is generated in said moving rope 1 by said eddy currents, which secondary magnetic field is detected by said eddy current testing probe of said movable eddy current testing probe arrangement 30 as an electromagnetic signal 40, i.e. as eddy current detection data 40.

In the detected electromagnetic signal 40 the test start markers, i.e. aluminium tapes, in the moving rope 1 can be detected as peaks 41, 42 indicating the start and the end of the test. Furthermore, in the detected electromagnetic signal 40, there can be detected unusual peaks 43-45 indicating defects in the middle part of said defected moving rope 1. From the detected electromagnetic signal 40 the defect indicating peaks 43-45 can be detected and analyzed by an on-line monitoring unit of the movable eddy current testing probe arrangement according to the present invention.

Figure 10:
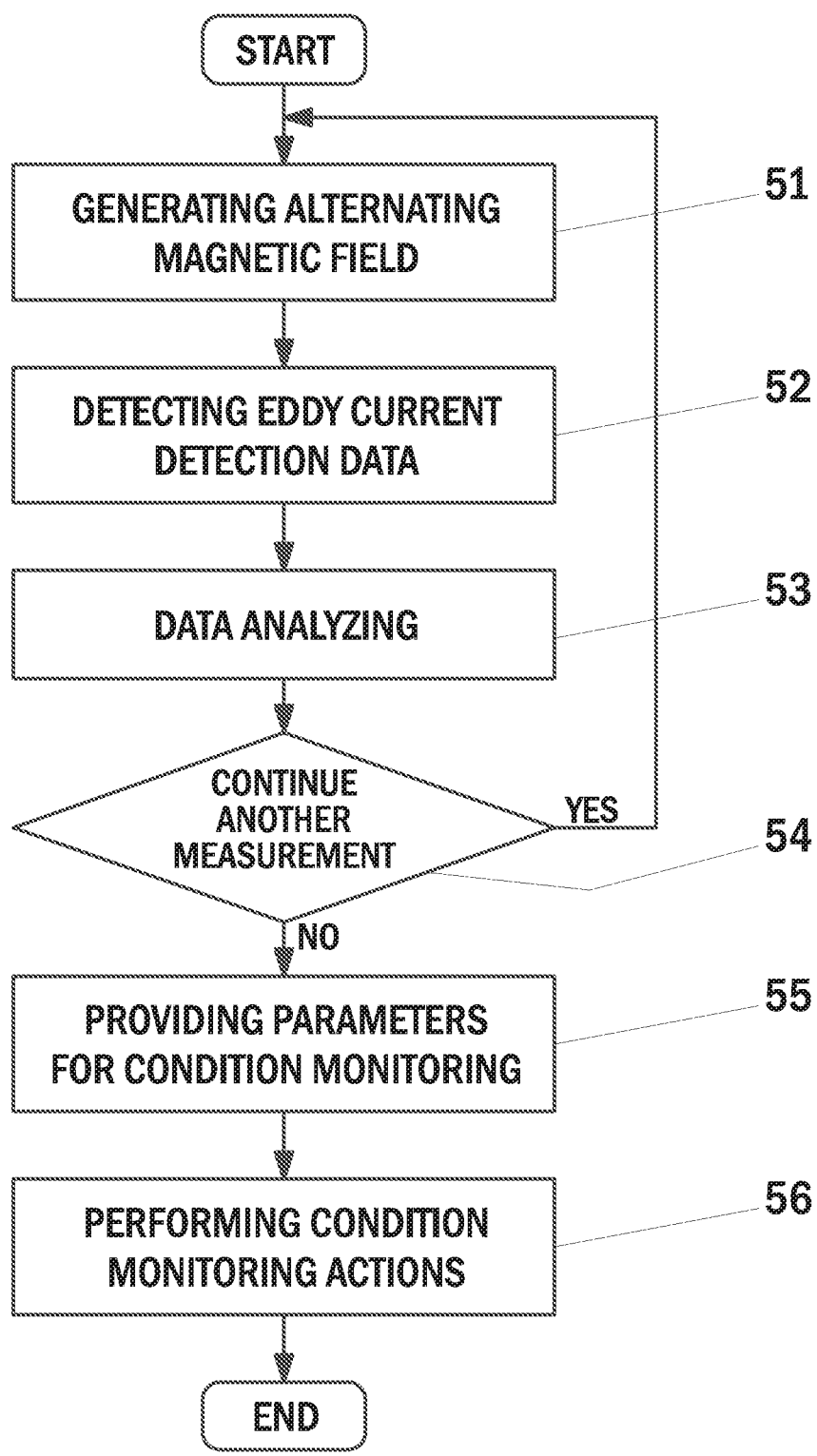
FIG. 10 illustrates a method for condition monitoring of a rope of a hoisting apparatus according to one embodiment of the present invention.

FIG. 10 illustrates a method for condition monitoring of a rope of a hoisting apparatus according to one embodiment of the present invention. In the method for condition monitoring according to one embodiment of the present invention an at least one eddy current testing probe placed near a monitored rope 1 first generates 51 an alternating magnetic field to said monitored rope 1. Said alternating magnetic field causes eddy currents in said rope 1, which said eddy currents in turn generate a secondary magnetic field in said monitored rope 1.

Thereafter, said at least one eddy current testing probe detects 52 said secondary magnetic field in said monitored rope 1 as eddy current detection data. After detecting, an analyzer unit of the condition monitoring arrangement analyzes 53 the detected eddy current detection data.

After carrying out the steps of inserting 51, detecting 52 and analyzing 53 the analyzer unit may or may not continue 54 with another measurement and repeat steps 51-53. The analyzer unit may be instructed to or may be automated to carry out multiple measurements. In said multiple measurements the analyzer unit may change the generated alternating magnetic field signal by changing e.g. signal form, signal amplitude and/or signal frequency of said generated alternating magnetic field.

After carrying out enough measurements by repeating the steps 51-53 the analyzer unit of the condition monitoring arrangement provides 55 one or more parameters to an on-line monitoring unit of said condition monitoring arrangement for the determination of the types of the defects and condition of the hoisting rope 1. After receiving one or more parameters for the determination of the types of the defects and condition of the hoisting rope 1 said on-line monitoring unit performs 56 condition monitoring actions.

When referring to conductivity, in this application it is meant electrical conductivity.

It is to be understood that the above description and the accompanying Figures are only intended to teach the best way known to the inventors to make and use the invention. It will be apparent to a person skilled in the art that the inventive concept can be implemented in various ways. The above-described embodiments of the invention may thus be modified or varied, without departing from the invention, as appreciated by those skilled in the art in light of the above teachings. It is therefore to be understood that the invention and its embodiments are not limited to the examples described above but may vary within the scope of the claims and their equivalents.

The invention claimed is:

1. A method of monitoring a condition of a rope of a hoisting apparatus, the method comprising:
generating an alternating magnetic field via an at least one eddy current testing probe, placed near said rope, to cause eddy currents to flow in a plurality of non-metallic conductive load bearing members of the rope the plurality of non-metallic conductive load bearing members extending in a longitudinal direction of the rope and being made of a non-metal composite material including electrically conducting reinforcing fibers arranged in a polymer matrix;
generating eddy current detection data based on a secondary magnetic field generated by said eddy currents in said rope; and
on-line monitoring of the rope based on the eddy current detection data.

2. The method according to claim 1, wherein the on-line monitoring of the rope based on said eddy current detection data includes monitoring the condition, a position, an alignment or a tension of said rope.

3. The method according to claim 1, wherein the on-line monitoring of the rope comprises:
providing information about a location of a fault or damage in the rope; and
providing one or more parameters for determining a type of a fault or damage in the rope.

4. The method according to claim 3, wherein the information includes fiber damage or delamination information for quantifying a severity of the fault or damage.

5. The method according to claim 3, wherein after receiving said one or more parameters for the determination of the condition of the rope, on-line monitoring actions are performed.

6. The method of claim 5, wherein the on-line monitoring actions include taking one or more actions to address the condition of the rope as being damaged, in response to the on-line monitoring determining that the condition of the rope is damaged.

7. An arrangement configured to monitor a condition of a rope of a hoisting apparatus, the arrangement comprising:
an at least one eddy current testing probe configured to, generate an alternating magnetic field to cause eddy currents to flow in a plurality of non-metallic conductive load bearing members of the rope when placed near the rope, the plurality of non-metallic conductive load bearing members extending in a longitudinal direction of the rope and being made of a non-metal composite material including electrically conducting reinforcing fibers arranged in a polymer matrix, and generate eddy current detection data based on a secondary magnetic field generated by said eddy currents in said rope; and an on-line monitoring device configured to on-line monitor said rope.

8. The arrangement according to claim 7, wherein said on-line monitoring device comprises a chassis that maintains a position of the probe, with regard to the rope.

9. The arrangement according to claim 7, wherein said on-line monitoring device is a movable eddy current testing probe arrangement configured to move relative to the rope.

10. The arrangement according to claim 9, wherein said movable eddy current testing probe arrangement comprises positioning elements, the positioning elements including wheels configured to position the movable eddy current testing probe arrangement relative to the rope.

11. The arrangement according to claim 7, wherein said at least one eddy current testing probe, comprises:

a plurality of detecting probes associated with respective ones of, the plurality of non-metallic conductive load bearing members in said rope.

12. The arrangement according to claim 7, wherein said on-line monitoring device is configured to use said eddy current detection data to monitor the condition, a position, an alignment or a tension of said rope.

13. The arrangement according to claim 7, wherein said rope comprises a non-conductive coating, said plurality of non-metallic conductive load bearing members being embedded in said coating, said coating forming a surface of the rope and extending between adjacent ones of the plurality of non-metallic conductive load bearing members thereby isolating them from each other.

14. The arrangement according to claim 7, wherein said reinforcing fibers are carbon fibers.

15. The arrangement according to claim 7, wherein upon receiving eddy current detection data said on-line monitoring device is configured to generate one or more parameters related to the condition, a position, an alignment or a tension of the rope.

16. The arrangement according to claim 7, wherein said on-line monitoring device is configured to generate one or more parameters for determining whether there is any fault or damage in the rope.

17. The arrangement according to claim 7, wherein said on-line monitoring device configured to generate one or more parameters for determining the type of a fault and/or damage in the rope.

18. The arrangement according to claim 7, wherein said on-line monitoring device is configured to generate information about a location of any heterogeneity in the rope.

19. The arrangement according to claim 18, wherein said on-line monitoring device is configured to generate information for quantifying a severity of a defect, the defect being one or more of fiber damage or delamination.

20. The arrangement according to claim 7, wherein said rope is belt-shaped such that the rope is larger in a width direction than a thickness direction.

21. The arrangement according to claim 12, wherein said on-line monitoring device is arranged for performing on-line monitoring actions.

22. The arrangement according to claim 7, wherein said eddy current testing probe is configured to carry out multiple measurements in detecting said eddy currents by changing one or more of signal form, signal amplitude or signal frequency of said generated alternating magnetic field.

23. The arrangement according to claim 7, wherein the at least one eddy current testing probe includes a plurality of eddy current testing probes on both sides of the rope or around the rope.

24. The arrangement according to claim 7, wherein said eddy current testing probe, comprises one or more bridge-type probes or one or more reflection-type probes.

25. The arrangement according to claim 7, wherein said eddy current testing probe, comprises one or more (i) excitation coils or excitation filaments and (ii) one or more sensing coils or sensing filaments.

26. The arrangement according to claim 25, wherein the excitation direction or the sensing direction is parallel to the plurality of non-metallic conductive load bearing members or parallel to individual ones of the reinforcing fibers of the plurality of non-metallic conductive load bearing members.

27. The arrangement according to claim 25, wherein at least a part of said excitation coils or said excitation filaments and said sensing coils or said sensing filaments is arranged in a perpendicular direction in relation to the load said load bearing members.

28. The arrangement according to claim 25, wherein at least a part of said excitation coils or said excitation filaments and said sensing coils or said sensing filaments is arranged as interlacing each other.

29. The arrangement according to claim 7, further comprising:

a data storage configured to store said eddy current detection data.

30. The arrangement of claim 21, wherein the on-line monitoring actions include taking one or more actions to address the condition of the rope as being damaged, in response to the on-line monitoring determining that the condition of the rope is damaged.

* * * * *